H. HOWARD.
PROCESS OF MAKING SULFURIC ANHYDRID.
APPLICATION FILED OCT. 21, 1909.
1,028,880.
Patented June 11, 1912.
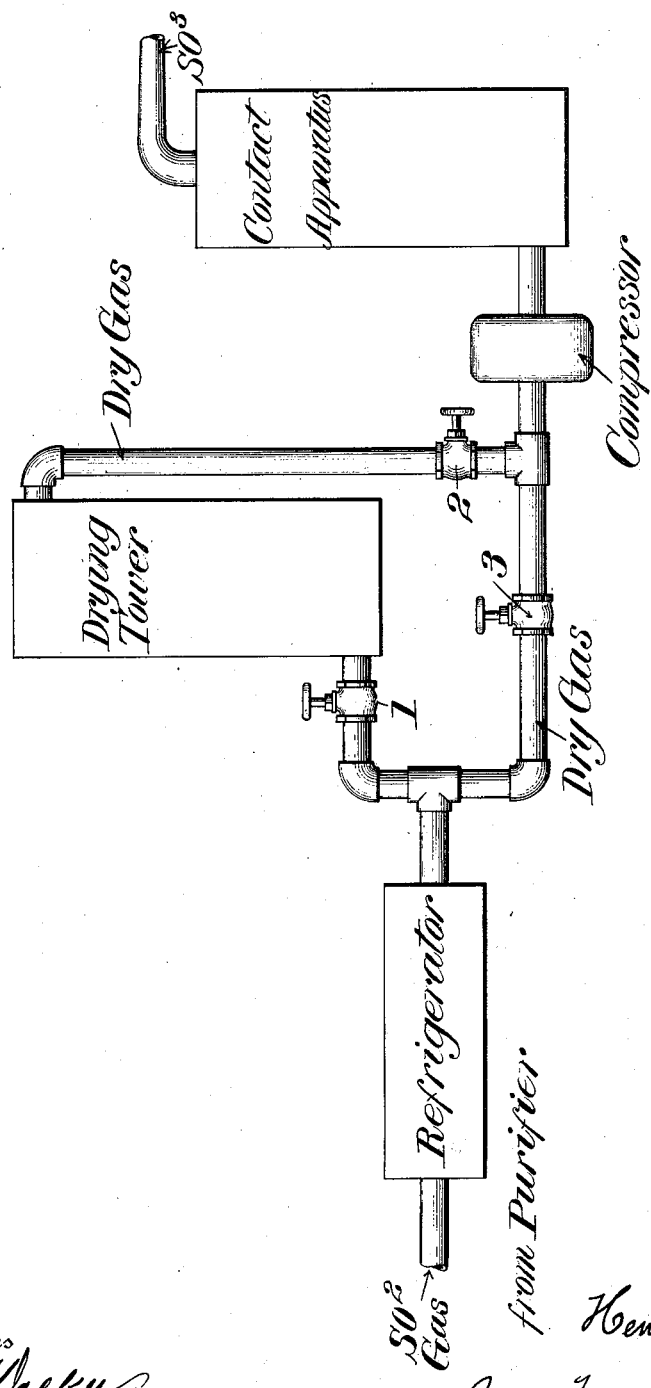

UNITED STATES PATENT OFFICE.

HENRY HOWARD, OF BOSTON, MASSACHUSETTS.

PROCESS OF MAKING SULFURIC ANHYDRID.

1,028,880. Specification of Letters Patent. Patented June 11, 1912.

Application filed October 21, 1909. Serial No. 523,808.

*To all whom it may concern:*

Be it known that I, HENRY HOWARD, a citizen of the United States, residing at Boston, in the county of Suffolk and State of Massachusetts, have invented certain new and useful Improvements in Processes of Making Sulfuric Anhydrid, of which the following is a specification.

This invention relates to the manufacture of sulfuric anhydrid from sulfur dioxid gas by the well known contact process. In the practice of this process, it has heretofore been the custom to dry the purified gases on their way to the contact chamber by passing them through a tower or other apparatus in which they were brought into contact with concentrated sulfuric acid. The strong acid used for this purpose soon becomes diluted, particularly in summer, when the air contains a comparatively large amount of moisture, and this consumption of strong acid in this drying operation substantially reduces the amount available for sale.

The present invention consists in drying the gases before their conversion into sulfuric anhydrid by cooling them to a point at which the moisture contained therein will be condensed and precipitated, the cooling being effected by passing the gases through any suitable refrigerating apparatus. The refrigeration of the gas has the further advantage that the effective capacity of the blowing or suction apparatus used to force the gases through the various apparatus will be increased almost in direct proportion to the lowering of the absolute temperature, thereby effecting a still further economy in the cost of manufacture.

In the refrigeration of the gas, the cooling may be carried to a temperature so low as to sufficiently remove the moisture, in which case the gas is conducted into the contact apparatus without passing through a sulfuric acid drying tower. Or the gas may be first cooled in the refrigerating apparatus to a temperature at which the greater part of the moisture condenses, and is then passed into a drying-tower where the residual moisture is absorbed by strong acid.

Referring to the drawing, which is diagrammatic in character, the purified $SO_2$ gases are passed through the refrigerator and thence either directly to the compressor by which they are delivered to the contact apparatus; or they pass from the refrigerator to a drying tower and thence to the compressor, suitable valves 1, 2, 3, to control the flow of gases being located in the pipes, as shown.

No particular forms of apparatus are illustrated, as they may be of any of the well known types of device used for the purposes indicated.

I claim:

1. In the process of making sulfuric anhydrid, the method which consists in refrigerating gases containing sulfur-dioxid to remove substantially all the moisture therefrom, and then converting the thus dried sulfur-dioxid into sulfuric anhydrid by the contact process.

2. In the process of making sulfuric anhydrid, the method which consists in refrigerating gases containing sulfur-dioxid to remove the greater part of the moisture therefrom, further drying the gases by bringing them into contact with concentrated sulfuric acid, and then converting the thus dried sulfur-dioxid into sulfuric anhydrid by the contact process.

In testimony whereof, I affix my signature in presence of two witnesses.

HENRY HOWARD.

Witnesses:
W. B. KEITH,
EDWIN R. BOND.